United States Patent
Yen et al.

(10) Patent No.: US 8,585,218 B2
(45) Date of Patent: Nov. 19, 2013

(54) LIGHT VALVE MODULE AND PROJECTION DEVICE USING THE SAME

(75) Inventors: Jui-Hsiang Yen, Hsinchu (TW); Wei-Szu Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 216 days.

(21) Appl. No.: 13/271,193

(22) Filed: Oct. 11, 2011

(65) Prior Publication Data

US 2012/0175507 A1    Jul. 12, 2012

(30) Foreign Application Priority Data

Jan. 10, 2011 (TW) .............................. 100100842 A

(51) Int. Cl.
*H01J 1/56* (2006.01)
(52) U.S. Cl.
USPC ........................................ 353/100; 353/119
(58) Field of Classification Search
USPC ........ 353/31, 34, 37, 100, 101, 119; 349/5–9; 359/809, 811, 819, 820
See application file for complete search history.

(56) References Cited

U.S. PATENT DOCUMENTS 6,280,036 B1   8/2001 Suzuki
6,808,272 B1 * 10/2004 Kuo .............................. 353/119
6,906,774 B2   6/2005 Saitoh
7,557,867 B2 * 7/2009 Goo .............................. 348/787
7,854,515 B2  12/2010 Matsuura et al.
8,061,850 B2 * 11/2011 Fujinawa et al. ............... 353/52
2012/0092629 A1 * 4/2012 Chang et al. .................... 353/97

OTHER PUBLICATIONS

Taiwan application: 99135273, Filing date: Oct. 15, 2010, pp. 1-28.
"Office Action of Taiwan Counterpart Application", issued on Jun. 19, 2013, p. 1-p. 6.

* cited by examiner

*Primary Examiner* — William C Dowling
(74) *Attorney, Agent, or Firm* — Jianq Chyun IP Office

(57) ABSTRACT

A light valve module and a projection device using thereof are provided. The projection device includes a chassis, a light source, a projection lens, the light valve module and a fastener assembly. The light valve module is configured within a cavity of the chassis by the fastener assembly and disposed on a transmission path of a light beam so as to convert the light beam to an image light beam. The light valve module includes a field lens, a light valve component and an elastic frame. First and second surfaces of the elastic frame respectively contact the field lens and the light valve component. A recess of the elastic frame is located on one of the first surface and the second surface. A pressed portion of the elastic frame is deformed towards the recess when the field lens and the light valve component press the elastic frame.

11 Claims, 8 Drawing Sheets

LIGHT VALVE MODULE AND PROJECTION DEVICE USING THE SAME

CROSS-REFERENCE TO RELATED APPLICATION

This application claims the priority benefit of Taiwan application serial no. 100100842, filed on Jan. 10, 2011. The entirety of the above-mentioned patent application is hereby incorporated by reference herein and made a part of this specification.

BACKGROUND OF THE INVENTION

1. Field of the Invention

The invention relates to a projection device, and more particularly, to a light valve module able to be anti-dust and a projection device using thereof.

2. Description of Related Art

Along with the progress that the size of a projection device can be made smaller and smaller, a miniaturization projection device has been launched on the market. In practical applications, the miniaturization projection device can be used independently or integrated into a mobile device (for example, mobile phone) so as to provide a projection function. The projection device mainly includes a light source, a light valve and a projection lens. An illumination light beam produced by the light source is converted into an image light beam through the light valve, and then the image light beam is projected by the projection lens.

In order to ensure the projected image quality of a projection device not interfered by dust, a good anti-dust design is necessary and it is more necessary for a miniaturization projection device. The patents relevant to the anti-dust design of a projection device include U.S. Pat. No. 6,906,774 and U.S. Pat. No. 7,854,515 and Taiwan Application No. 99135273.

SUMMARY OF THE INVENTION

Accordingly, the invention is directed to a light valve module with anti-dust function.

The invention is also directed to a projection device, the light valve module of the projection device has anti-dust function.

Other advantages of the invention should be further indicated by the disclosures of the invention, and omitted herein for simplicity.

To achieve one of, a part of or all of the above-mentioned advantages, or to achieve other advantages, an embodiment of the invention provides a light valve module and a projection device using thereof. The projection device includes a chassis, a light source, a light valve module, a fastener assembly and a projection lens. The chassis has a cavity, the light source and the projection lens are disposed in the chassis and the fastener assembly is used for fixing the light valve module to the cavity of the chassis. The light source is used for projecting an illumination light beam, the light valve module located on the transmission path of the illumination light beam is suitable to convert the illumination light beam into an image light beam, and the projection lens is located on the transmission path of the image light beam and converts the image light beam into a projection light beam.

The above-mentioned light valve module includes a field lens, a light valve component and an elastic frame, wherein the elastic frame is disposed between the field lens and the light valve component and has a first surface, a second surface, an opening and a recess. The first surface contacts the field lens, the second surface contacts the light valve component, the opening penetrates the first surface and the second surface to allow the light beams passing, and the recess is dented at one of the first surface and the second surface. A pressed portion of the elastic frame is deformed towards the recess when the field lens and the light valve component press the elastic frame.

Based on the description above, in the mentioned embodiment of the invention, a pressed portion of the elastic frame is deformed towards the recess when the field lens and the light valve component press the elastic frame. Hence, under a predetermined assembly tolerance, the elastic frame is able to entirely seal up a space between the field lens and the light valve component. Meanwhile, the deformation of the pressed portion of the elastic frame unlikely affects the original contour of the opening of the elastic frame so as to avoid affecting the passing of the light beam.

In order to make the aforementioned and other features and advantages of the invention comprehensible, several exemplary embodiments accompanied with figures are described in detail below.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing,"

"faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
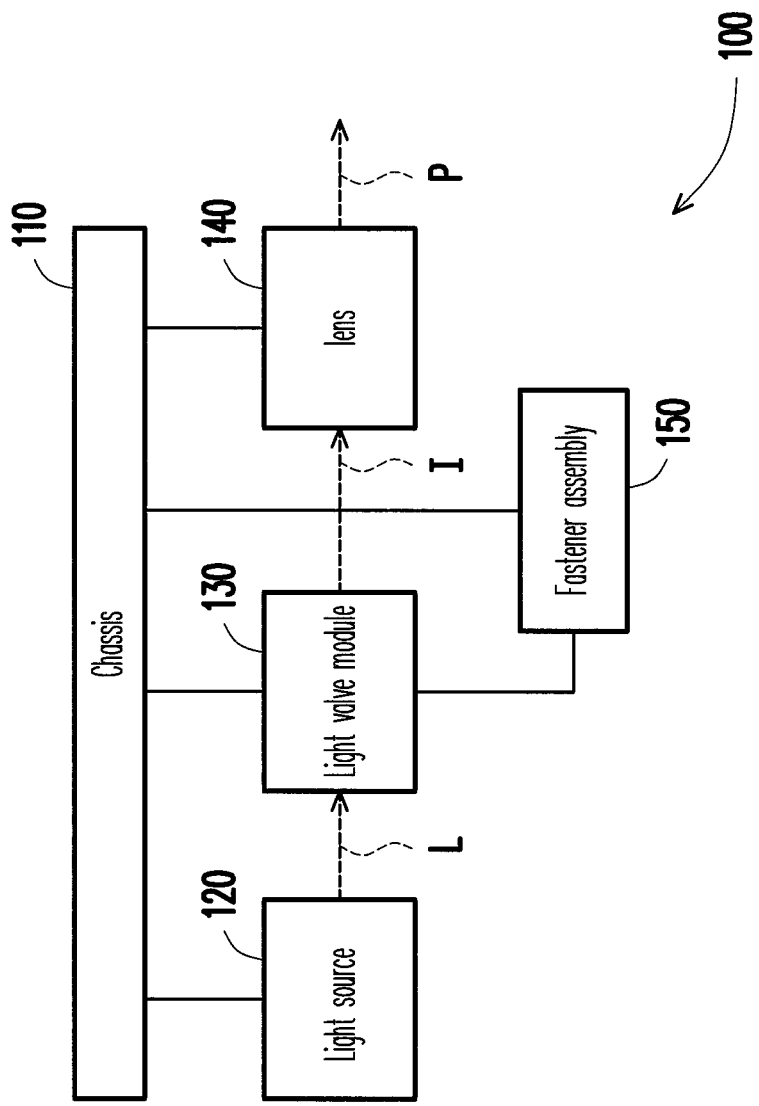
FIG. 1 is a block chart of a projection device according to an embodiment of the invention.
Figure 2:
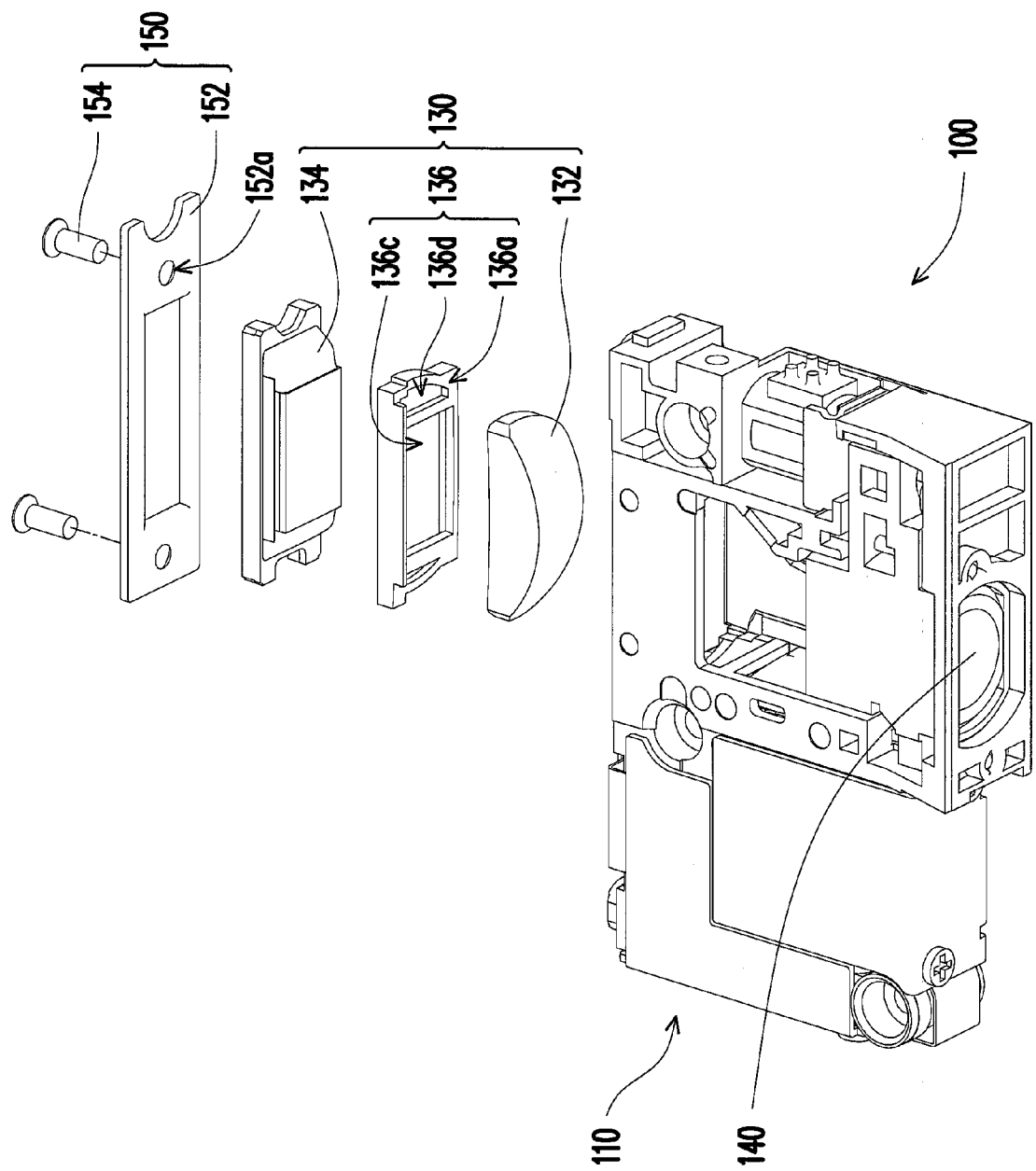
FIGS. 2 and 3 are respectively a exploded diagram of the projection device of FIG. 1 from two different angles of view.
Figure 3:
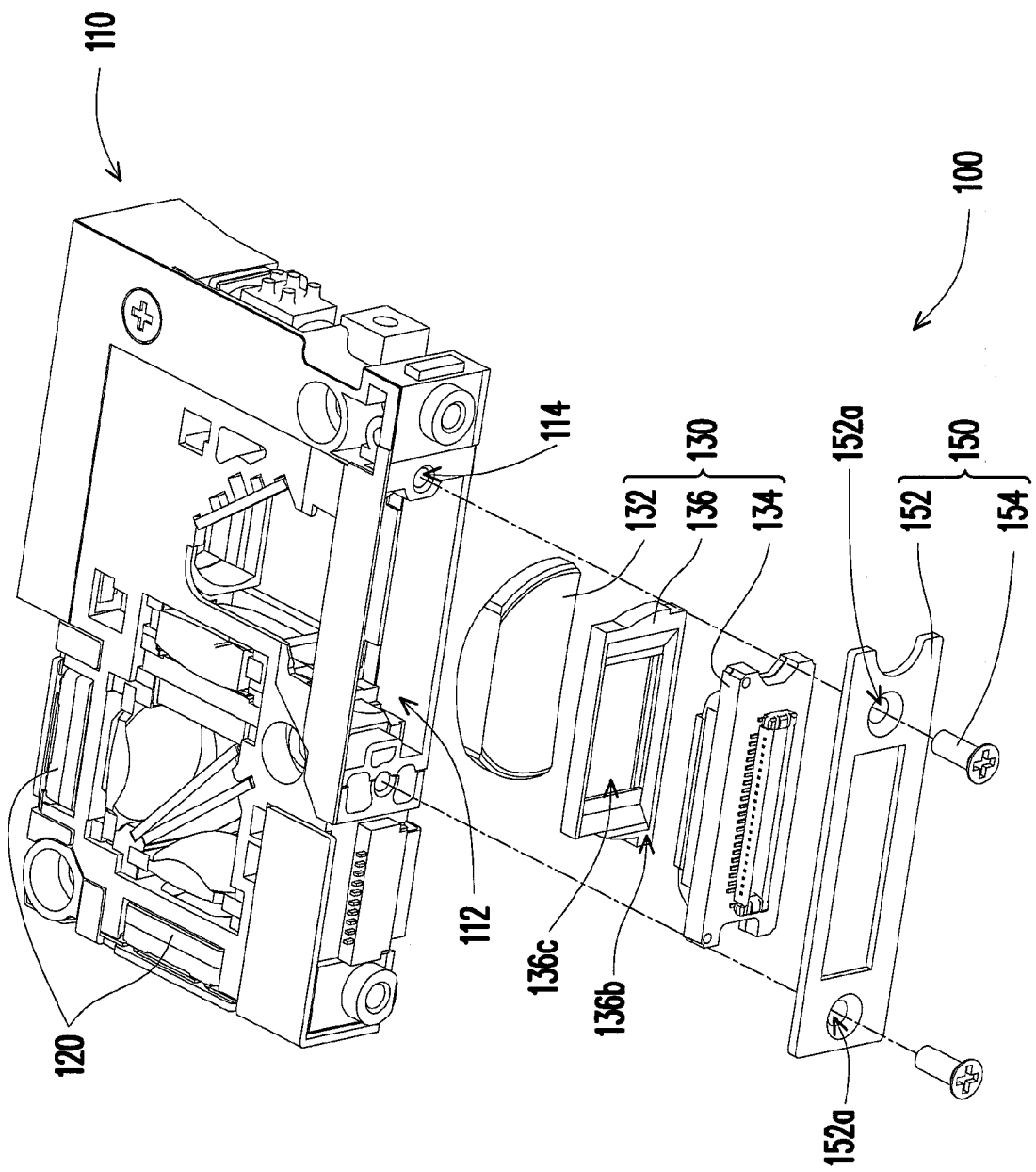

FIG. 1 is a block chart of a projection device according to an embodiment of the invention, and FIGS. 2 and 3 are respectively a exploded diagram of the projection device of FIG. 1 from two different angles of view. Referring to FIGS. 1, 2 and 3, a projection device 100 includes a chassis 110, a light source 120, a light valve module 130, a projection lens 140 and a fastener assembly 150. Both the light source 120 and the projection lens 140 are disposed in the chassis 110. The light valve module 130 is accommodated in a cavity 112 of the chassis 110 and located on the transmission path of the illumination light beam L emitted by the light source 120 so as to convert the illumination light beam L into an image light beam I. After that, the image light beam I is converted by the projection lens 140 located on the transmission path of the image light beam I into a projection light beam P to be projected. The fastener assembly 150 fixes the light valve module 130 to the cavity 112 of the chassis 110.

The light valve module 130 includes a field lens 132, a light valve component 134 and an elastic frame 136, wherein the elastic frame 136 is disposed between the field lens 132 and the light valve component 134, and the elastic frame 136 has a first surface 136a, a second surface 136b and an opening 136c. The first surface 136a contacts the field lens 132, the second surface 136b contacts the light valve component 134 and the opening 136c penetrates the first surface 136a and the second surface 136b so as to allow the light beams L and I passing.

Figure 4:
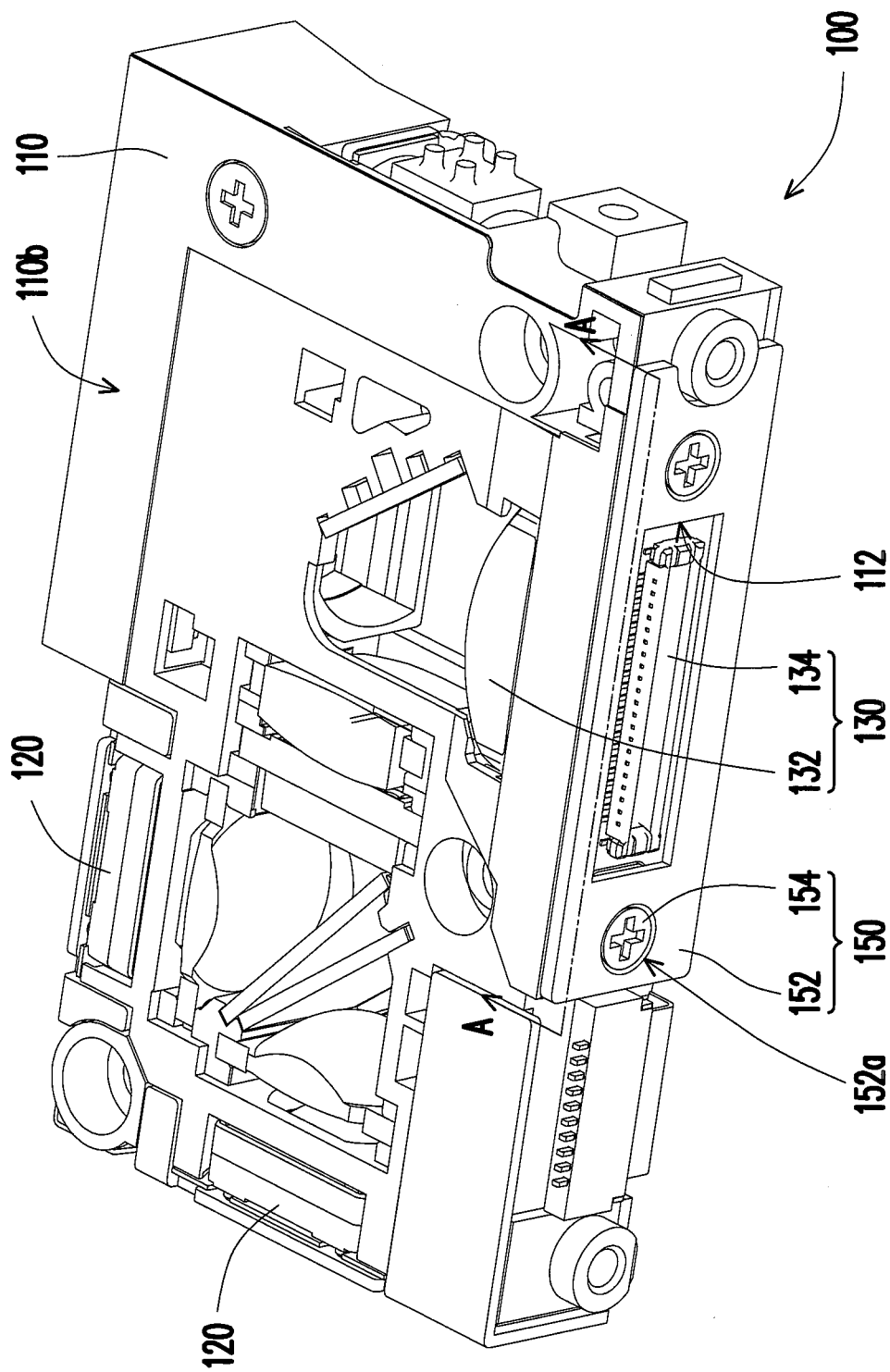
FIG. 4 is an assembly diagram of the projection device of FIG. 3.

FIG. 4 is an assembly diagram of the projection device of FIG. 3. Referring to FIGS. 3 and 4, in the embodiment, the fastener assembly 150 includes a front board 152 and two screws 154, wherein the front board 152 has two through holes 152a, and the chassis 110 has two thread holes 114 disposed correspondingly to the through holes 152a. After sequentially placing the field lens 132, the light valve component 134 and the elastic frame 136 into the cavity 112, the screws 154 respectively go through the through holes 152a and are screwed in the thread holes 114 of the chassis 110, so that the front board 152 fixes relative positions of the light valve module 130 and the chassis 110.

Figure 5:
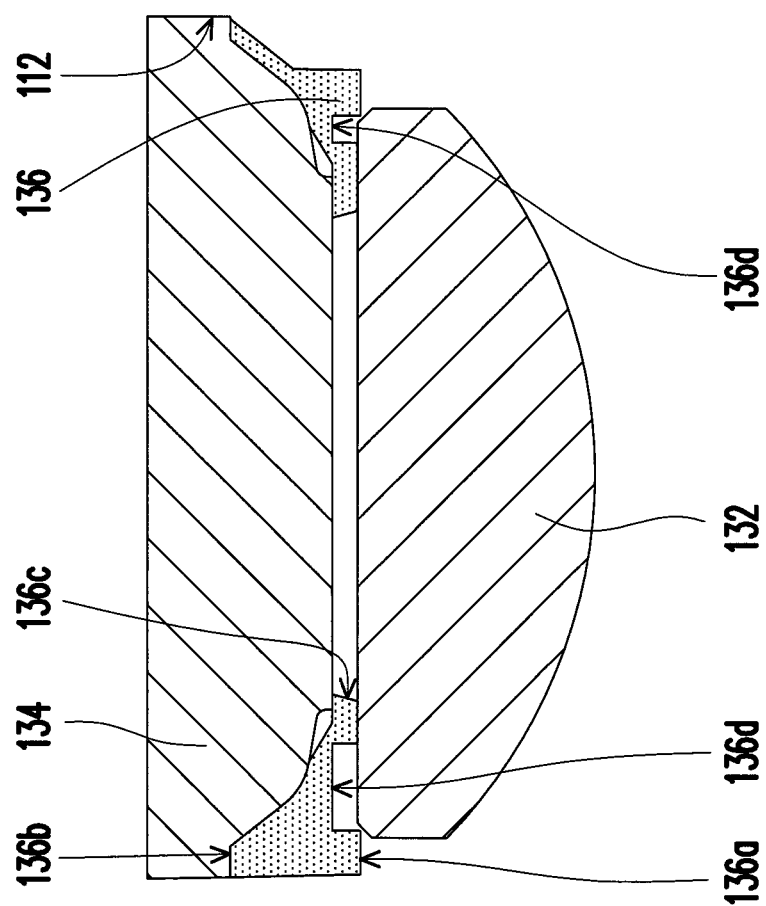
FIG. 5 is a localized cross-sectional diagram of the light valve module of the projection device in FIG. 4.
Figure 6:
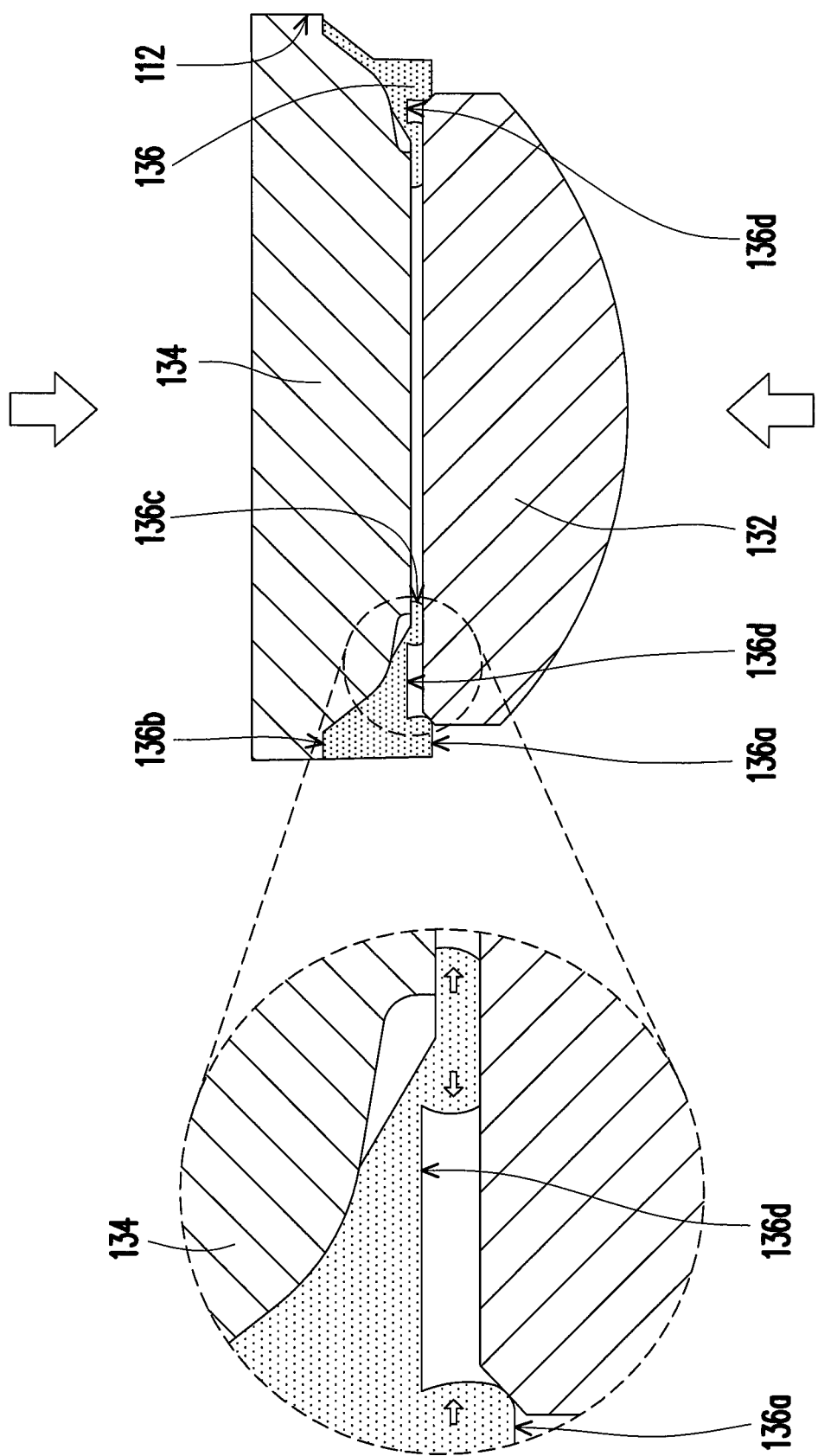
FIG. 6 is a cross-sectional diagram illustrating the elastic frame of FIG. 5 is deformed by pressing.

FIG. 5 is a localized cross-sectional diagram of the light valve module of the projection device in FIG. 4, wherein the elastic frame 136 of the module is not pressed and FIG. 6 is a cross-sectional diagram illustrating the elastic frame of FIG. 5 is deformed by pressing. Referring to FIGS. 2, 5 and 6, when the fastener assembly 150 fixes the light valve module 130 to the cavity 112 of the chassis 110, the first surface 136a of the elastic frame 136 contacts and is sealed with the field lens 132, while the second surface 136b of the elastic frame 136 contacts and is sealed with the light valve component 134, so as to prevent dust from entering the space between the field lens 132 and the light valve component 134.

In order to disperse the deformation of the pressed elastic frame 136, the elastic frame 136 has a plurality of recesses 136d. The plurality of recesses 136d are dented at the first surface 136a. When the fastener assembly 150 fixes the light valve module 130 to the cavity 112 of the chassis 110, the field lens 132 and the light valve component 134 together press the elastic frame 136, so that the pressed portion of the elastic frame 136 can be deformed towards the recesses 136d. As a result, the pressed portion of the elastic frame 136 provides a sufficient resistant stress to entirely seal up the space between the field lens 132 and the light valve component 134. Meanwhile, the pressed portion of the elastic frame 136 unlikely affects the original profile of the opening 136c of the elastic frame 136 so as to avoid the passes of the illumination light beam L and the image light beam I.

In the embodiment, the ratio range of the two thicknesses between the first surface 136a and the second surface 136b of the elastic frame 136 after being pressed over before being pressed is about 0.6-0.7. In addition, the ratio range of the volume of the pressed portion between the first surface 136a and the second surface 136b of the elastic frame 136 over the space volume of the recess is about 0.4-0.5.

In the embodiment, when the field lens 132 and the light valve component 134 together press the elastic frame 136, the air in the recesses 136d is expelled out from the recesses 136d so that the barometric pressure in the recesses 136d is less than the environmental atmospheric pressure. Moreover, the pressure difference between the environment and inside of the recesses 136d enables the elastic frame 136 and the field lens 132 attractive to each other. It is helpful to make the elastic frame 136 and the field lens 132 sealed with each other.

Figure 7:
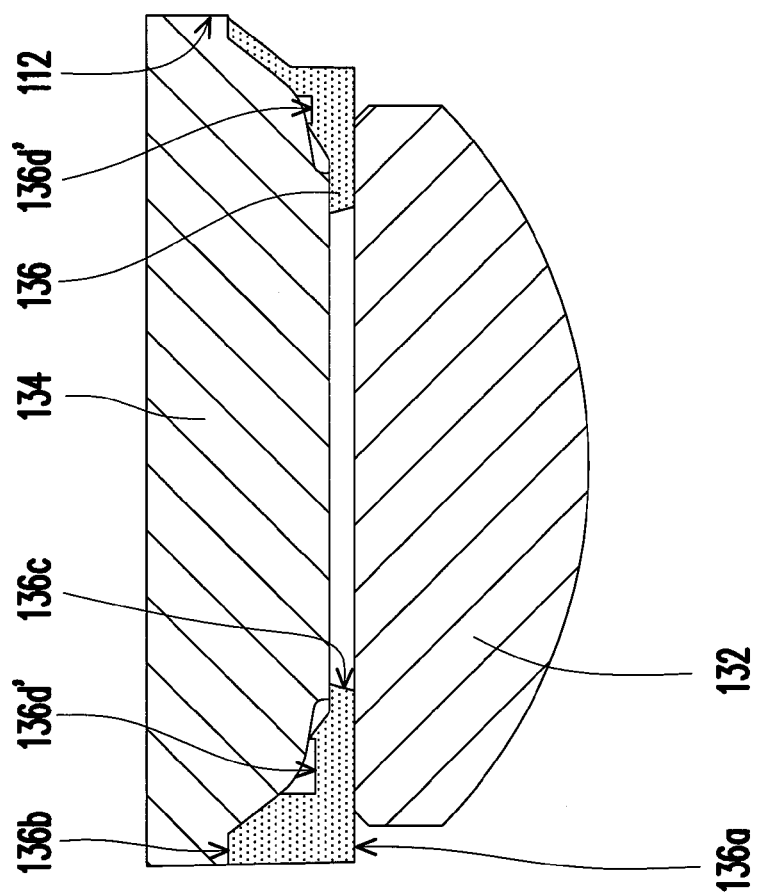
FIG. 7 is a localized cross-sectional diagram of the light valve module of the projection device according to another embodiment of the invention.

FIG. 7 is a localized cross-sectional diagram of the light valve module of the projection device according to another embodiment of the invention. Referring to FIG. 7, the difference of the embodiment from the embodiment of FIG. 5 rests in that the recesses $136d'$ are dented at the second surface 136b of the elastic frame 136. After assembling, when the barometric pressure in the recesses $136d'$ is less than the environmental atmospheric pressure, the pressure difference is helpful for sealing up the second surface 136b of the elastic frame 136 and the light valve component 134.

Figure 8:
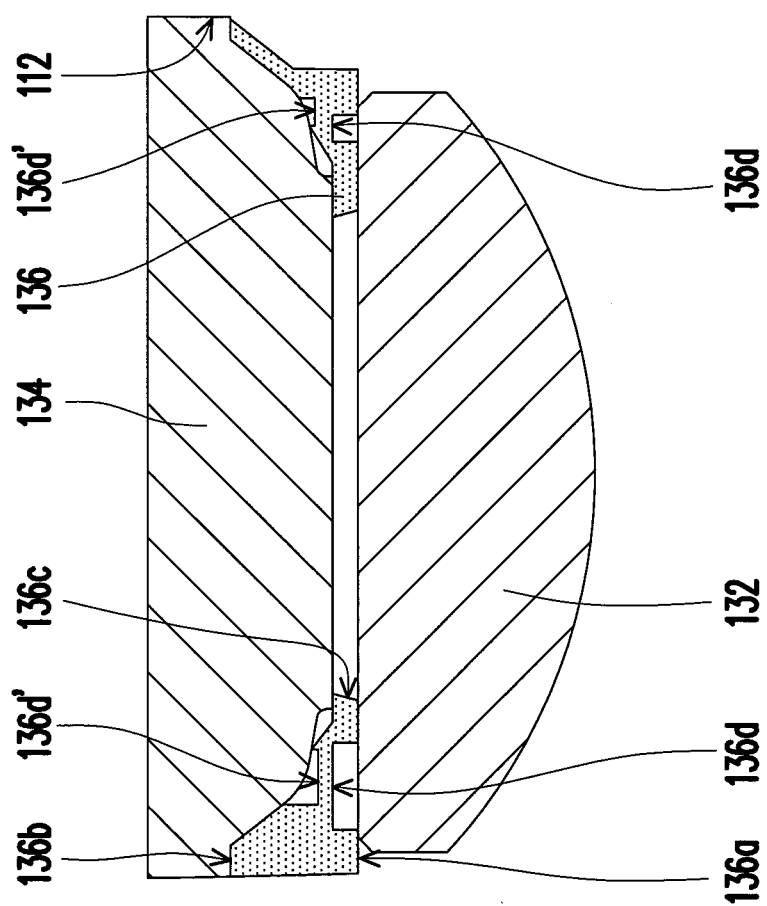
FIG. 8 is a localized cross-sectional diagram of the light valve module of the projection device according to yet another embodiment of the invention.

FIG. 8 is a localized cross-sectional diagram of the light valve module of the projection device according to another embodiment of the invention. Referring to FIG. 8, the difference of the embodiment from the embodiments of FIGS. 5 and 7 rests in that the elastic frame 136 has a plurality of recesses 136d dented at the first surface 136a of the elastic frame 136, meanwhile, there are other plural recesses $136d'$ dented at the second surface 136b of the elastic frame 136.

In summary, in the above-mentioned embodiments of the invention, the elastic frame is designed to seal up with the field lens and the light valve component, which is helpful to avoid dust from entering the space between the field lens and the light valve component so as to ensure the projection device having good imaging quality.

Besides, in the above-mentioned embodiments of the invention, when the field lens and the light valve component together press the elastic frame, the pressed portion of the elastic frame is able to be deformed towards the recesses. As a result, under a predetermined assembly tolerance, the elastic frame is able to entirely seal up the space between the field lens and the light valve component. Meanwhile, the deformation of the pressed portion of the elastic frame unlikely affects the original profile of the opening of the elastic frame so as to avoid affecting the pass of the light beam.

Moreover, in the above-mentioned embodiments of the invention, when the field lens and the light valve component together press the elastic frame, the air in the recesses is expelled out from the recesses so that the barometric pressure in the recesses is less than the environmental atmospheric pressure. With the pressure difference between the environment and inside of the recesses, the elastic frame and the field lens or/and the light valve component are attractive to each other, which is helpful to make the elastic frame and the field lens or/and the light valve component sealed with each other.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light valve module, comprising:
a field lens;
a light valve component; and
an elastic frame, disposed between the field lens and the light valve component, wherein the elastic frame has a first surface, a second surface, an opening and at least one recess, the first surface contacts the field lens, the second surface contacts the light valve component, the opening penetrates the first surface and the second surface to allow a light beam passing and the recess is dented at at least one of the first surface and the second surface; wherein the elastic frame is deformed towards the recess when the field lens and the light valve component press the elastic frame.

2. The light valve module claimed in claim 1, wherein the first surface is sealed with the field lens, the second surface is sealed with the light valve component and the barometric pressure in the recess is less than the environmental atmospheric pressure.

3. The light valve module claimed in claim 1, wherein the material of the elastic frame is rubber.

4. The light valve module claimed in claim 1, wherein the ratio range of the two thicknesses between the first surface and the second surface of the elastic frame after being pressed over before being pressed is about 0.6-0.7.

5. The light valve module claimed in claim 1, wherein the ratio range of the volume of the pressed portion between the first surface and the second surface of the elastic frame over the space volume of the recess is about 0.4-0.5.

6. A projection device, comprising:
a chassis, having a cavity;
a light source, disposed in the chassis and emitting an illumination light beam;
a light valve module, accommodated in the cavity of the chassis, located on the transmission path of the illumination light beam and converting the illumination light beam into an image light beam, the light valve module comprising:
a field lens;
a light valve component;
an elastic frame, disposed between the field lens and the light valve component, wherein the elastic frame has a first surface, a second surface, an opening and at least one recess, the first surface contacts the field lens, the second surface contacts the light valve component, the opening penetrates the first surface and the second surface to adapt a light beam passing and the recess is dented at at least one of the first surface and the second surface; wherein
the elastic frame is deformed towards the recess when the field lens and the light valve component press the elastic frame; and
a fastener assembly, fixing the light valve module to the cavity of the chassis; and
a projection lens, disposed in the chassis, located on the transmission path of the image light beam and converting the image light beam into a projection light beam.

7. The light valve module claimed in claim 6, wherein the first surface is sealed with the field lens, the second surface is sealed with the light valve component and the barometric pressure in the recess is less than the environmental atmospheric pressure.

8. The light valve module claimed in claim 6, wherein the material of the elastic frame is rubber.

9. The light valve module claimed in claim 6, wherein the ratio range of the two thicknesses between the first surface and the second surface of the elastic frame after being pressed over before being pressed is about 0.6-0.7.

10. The light valve module claimed in claim 6, wherein the ratio range of the volume of the pressed portion between the first surface and the second surface of the elastic frame over the space volume of the recess is about 0.4-0.5.

11. The light valve module claimed in claim 6, wherein the fastener assembly comprises a front board and two screws, wherein the front board has two through holes, the chassis has two thread holes, the thread holes are disposed correspondingly to the through holes, and the screws respectively go through the through holes to be screwed in the thread holes of the chassis.

* * * * *